Aug. 4, 1964

E. T. YAEGER 3,143,140

AUTOMATIC WATER SOFTENER CONTROL VALVE
AND OPERATING MEANS THEREFOR

Filed July 15, 1959

Inventor
Edward T. Yaeger
Andrew F. Wintercorn
Atty.

Fig. 13

Inventor
Edward T. Yaeger

United States Patent Office 3,143,140
Patented Aug. 4, 1964

3,143,140
AUTOMATIC WATER SOFTENER CONTROL
VALVE AND OPERATING MEANS THEREFOR
Edward T. Yaeger, Elgin, Ill., assignor to Elgin Softener
Corporation, Elgin, Ill., a corporation of Illinois
Filed July 15, 1959, Ser. No. 827,309
21 Claims. (Cl. 137—624.2)

This invention relates to water softeners and is more particularly concerned with what is commonly known as a completely automatic softener that may be set to regenerate weekly or oftener if desired, all automatically, although a manually operable switch may be provided to enable starting regeneration whenever the operator so desires.

In accordance with my invention, an improved automatic valve mechanism is provided, utilizing a lift-turn type valve, the stem plate of which is normally held seated partly under spring pressure and partly under hydraulic pressure within the bonnet or cover but is adapted to be lifted against little more than the spring pressure alone, due to the novel way in which a restriction plug that is operated in timed relationship to the stem plate is moved into the drain port before the rotary cam used for lifting the stem plate through the medium of a lift lever starts the lifting operation, whereby pressure is substantially equalized on opposite sides of the stem plate. Very little water is permitted to escape in the lifting, turning and reseating operation, and yet the drain port is left open otherwise during regeneration, as is necessary for outflow of waste water during backwash, salting and rinsing. A crank wheel lift cam assembly driven by the power motor also operates a stem plate drive pawl which cooperates with four pins on a stem plate ratchet spaced 90° apart to turn the stem plate through 90° in each turn of the crank wheel in timed relationship to the cam operation of the lift lever, so as to turn the stem plate while it is lifted, 90° movements being all that is required in turning from "Backwash" position to the "Salt-Rinse" position and finally back to the "Service" position, but two consecutive 90° operations being required in turning from the "Service" position to the "Backwash" position at the commencement of each regeneration. The calendar clock (or manual switch) at the commencement of each regeneration starts a timer motor by closing a pilot circuit, the timer motor serving to rotate a timer dial clockwise one revolution in one hour. A holding cam on the back of this dial, which opened the circuit in a hold switch to stop the timer dial and timer motor at the end of the previous regeneration, is moved clear of the hold switch while the calendar clock keeps the timer motor running, after which cams on the front of the timer dial operate a timer switch to close the circuit for the power motor to start each cycle of lifting, turning and reseating the stem plate by means of the crank wheel and lift cam assembly and stem plate ratchet, a stop cam being provided on the crank wheel which at the end of each revolution of the wheel operates a stop switch to open the circuit for the power motor.

The invention is illustrated in the accompanying drawings, in which—

The same reference numerals are applied to corresponding parts throughout the views.

Referring to the drawings, and first generally to FIGS. 1 to 7, the reference numeral 15 designates the softener tank, 16 the brine tank, and 17 the master valve assembly mounted on the side of the softener tank on mounting plate 18, two pipes 19 and 20 being provided inside the softener tank and extending through openings in the plate 18 for connection with the ports 21 and 22, respectively, in the master valve base 23 and sealed in water tight relationship to both the softener tank and valve base 23 by compression of gasket rings 24 between the plate 18 and the base 23 when nuts 25 threaded on studs 26 entered through holes 27 in the ears 28 on the base 23 are tightened. Locating recesses 29 are provided in the base 23 to receive metallic rings 30 threaded on the ends of the pipes 19 and 20, and hence, as the gasket rings 24 which surround the protruding ends of the pipes are compressed between the plate and base the joints are nicely sealed against water leakage and pipes 19 and 20 are at the same time secured rigidly in the correct relationship to tank 15 with the openable-closeable strainer head 31 on the extremity of the upwardly bent inner end portion 32 of pipe 19 near the top of the free-board space 33 in the tank above the bed 34 of zeolite or other water softening material, and with the strainer 35 that is provided on the lower end of a pipe 36 connected by means of an elbow to the inner end of the pipe 20 disposed at or near the bottom of the tank centrally with respect to the gravel bed 37 usually provided, all as previously disclosed in my copending application, Serial No. 774,457, filed November 17, 1958, now U.S. Patent No. 3,075,555. The tank 15 is fully covered by a heavy layer of insulation, as indicated at 38, which effectively prevents condensation on the outside of the tank in the varying atmospheric conditions encountered. Only the valve assembly 17 and its pipe connections with the raw water supply pipe 39 at 40 on base 23, service pipe 41 at 42 on base 23, and drain pipe 43 at 44 on base 23 are left exposed, but these exposed parts are so located over the brine tank cover 45 that any drippings due to condensation will be caught and drained through an opening 46 into the brine tank 16. The drain opening 46 also permits extension of the flexible brine suction and refill pipe 47 from the fitting 48 on base 23 to fitting 49 on the lower end section 50 of the suction and refill pipe that extends to the foot valve 51 in the bottom of the float well 52 in brine tank 16.

Figure 1:
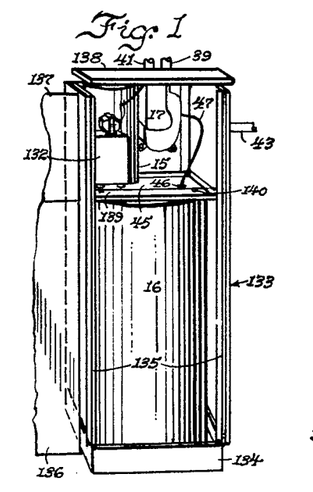
FIG. 1 is a perspective view of an automatic water softener unit embodying my invention, the front of the cabinet being shown open with the upper and lower front panels, which serve as removable closures therefor, disposed to one side and with the top panel also indicated as separated from the top of the cabinet to indicate the removability thereof.
Figure 2:
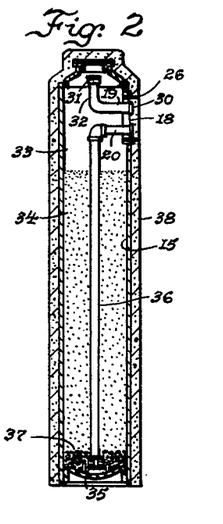
FIG. 2 is a vertical section through the softener tank, only the upper portion of which appears inside the cabinet in FIG. 1.
Figure 3:
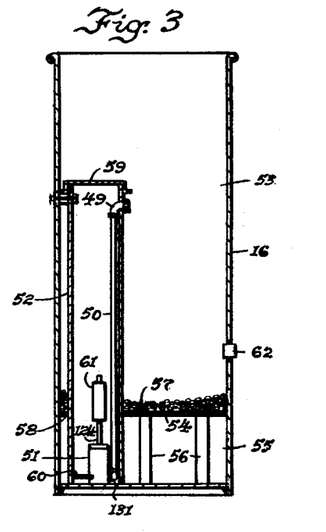
FIG. 3 is a vertical section through the brine tank which is shown inside the cabinet in FIG. 1.

The brine tank 16 is of the dry salt type having a salt storage compartment 53 above a salt floor 54, and a brine compartment 55 therebeneath, the construction being patterned along the lines of Nickols Patent No. 2,805,922, the floor being loosely supported on legs 56 on the bottom of the brine tank, allowing a certain amount of communication around it between the compartments 53 and 55 and also having small openings provided therein so that while the floor 54 supports the salt bed on a layer of gravel indicated at 57 it also allows fluid circulation therethrough and around it for dissolving salt from the bottom of the bed until the water in the brine compartment becomes saturated when, of course, no more salt can go into solution, the rate of circulation between the two compartments gradually decreasing as the saturation point is approached. The float well 52 extends freely through an opening 58 in the floor 54 and rests loosely on the bottom of the brine tank 16 so that water in the refilling of the brine compartment rises in the bottom of the float well to the same level as in the brine tank. The float well has a removable cover 59 on the upper end thereof where the float well is suitably secured to the adjacent side wall of the brine tank, the cover serving to exclude salt from the float well and yet permit a serviceman to have access to the inside thereof whenever it may become necessary to remove the foot valve 51 for inspection, servicing or replacement. 60 is a spacer on the side of the foot valve 51 insuring proper location thereof on the bottom of the brine tank relative to the side walls of the float well so that the float 61 which extends upwardly from the foot valve will not be apt to rub against the side walls of the float well but will be movable freely at all times to shut off the refill flow when the water reaches a predetermined level above the gravel bed 57. As a safety measure, an overflow opening is provided at 62 in the side wall of the brine tank a short distance above the high level mentioned, so that if the operator sees water running out this overflow he can immediately check the softener and shut off the water until the difficulty is corrected.

Figure 8:
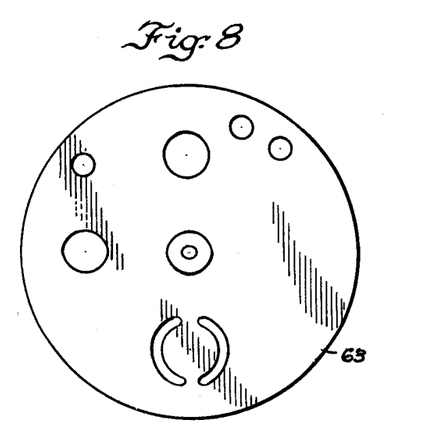
FIGS. 8 and 9 are a face view and back view of the stem plate.
Figure 9:
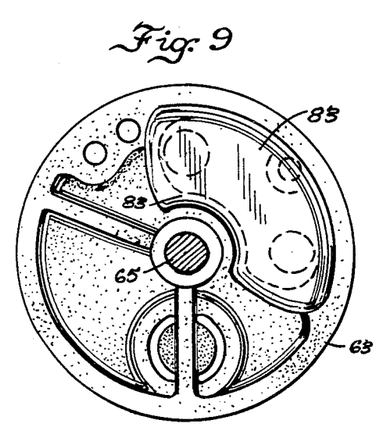
Figure 13:
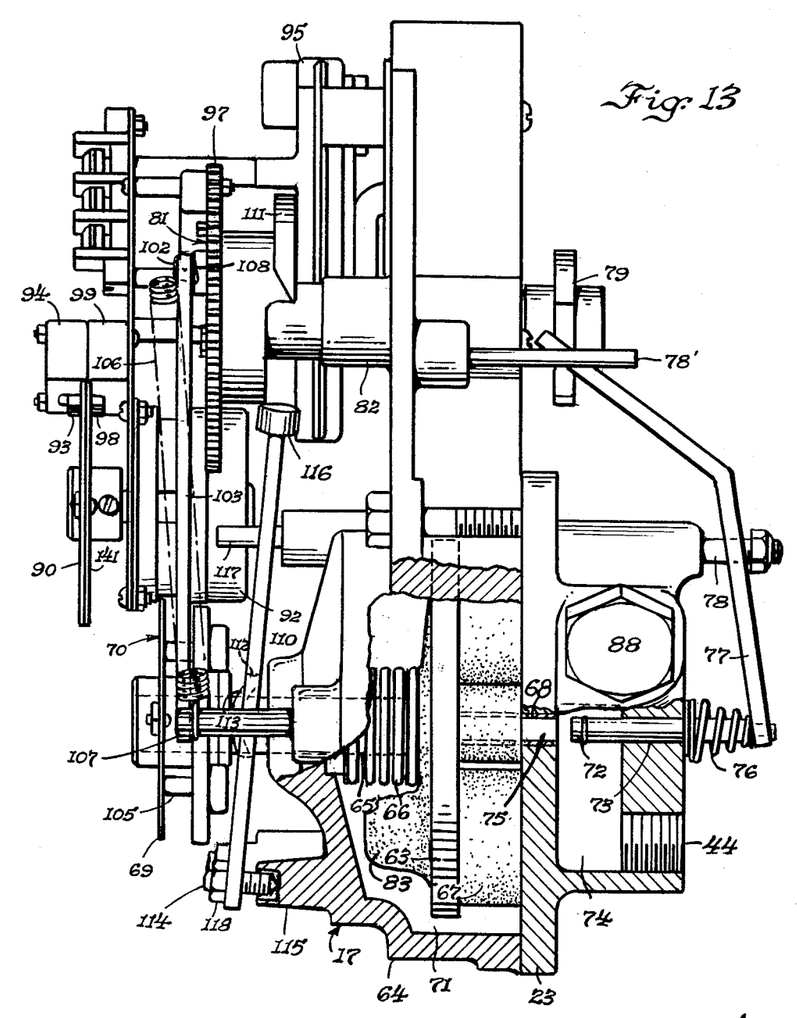
Figure 14:
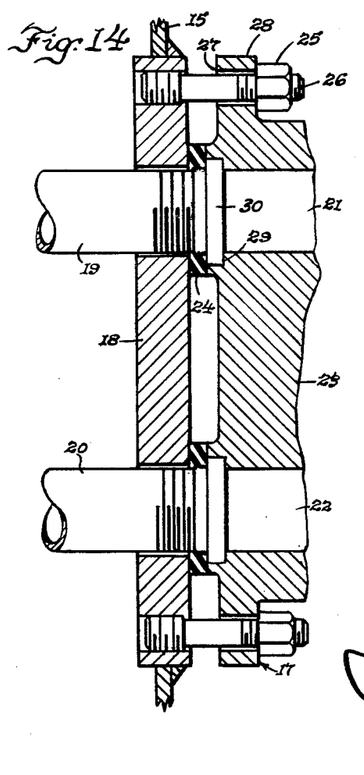
FIG. 14 is a section through the joint between the base of the master valve and mounting plate illustrating the sealed connections for the outer ends of the two internal pipes appearing in FIG. 2.

The master valve 17 is of the lift-turn type comprising, in addition to the base 23, a stem plate 63 and bonnet or cover 64. The stem 65 of the stem plate extends through an opening in the cover 64 and has a coiled compression spring 66 surrounding it between the inside of the cover and the top of the stem plate normally urging the stem plate toward its seated position on rubber seat rings 67 that surround and project from the outer ends of bushings 68 defining the ports in the base 23 in accordance with the disclosure of McGill Patent No. 2,209,992. The ports in the stem plate shown in FIG. 8 register with the ports in the base in different positions of indexing of the stem plate to provide downflown service, upflow backwash, and downflow salting and rinsing, and, as will later appear, it requires a half turn of the stem plate 63 to shift it from the service position to the backwash position, then a quarter turn to shift it to the salting and rinsing position, and finally another quarter turn to return it to the service position, these three positions being indicated by legends "Service," "Backwash" and "Salt-Rinse" on the face plate 69 of the stem plate ratchet assembly 70. The stem plate 63 is also normally held seated under hydraulic pressure of the water in the chamber 71 inside the cover plate 64 and, in order to make it easier to lift the stem plate, a plug 72 operable through a hole 73 in one wall of the drain passage 74 in the base 23 is arranged to be entered in the drain port 75 to restrict, if not shut off, the flow through the drain before the stem plate 63 is lifted, so that the lifting is done only against the resistance of spring 66. A coiled compression spring 76 normally holds the plug 72 in retracted position but the plug is arranged to be pushed into the drain port by one end of the lever 77 that is fulcrumed intermediate its ends on a stud 78 with respect to the base 23 and oscillated at its other end by means of a rotary cam 79 turning with one end of a shaft 80 that carries the crank wheel and lift cam assembly 81 on its other end, the shaft 80 being mounted intermediate its ends in a bearing 82 on the cover plate 64. In that way the closing or restricting of the drain port 75 is accurately timed in relation to the lifting and turning of the stem plate 63. The drain port 75 between operations of the plug 72 during the regeneration cycle remains open, as is necessary for flow of waste water during backwash and also during salting and rinsing. In the normal "Service" position of the master valve, the drain port 75 is closed by the stem plate. A pin 78′, as best appears in FIGS. 11 and 13, projects from the base 23 in parallel relation to shaft 80 and serves as a guide for the cam operated end of lever 77. In passing, attention is called to the hollow boss 83 on the back of the stem plate 63 which interconnects two of its ports spaced 90° apart. No invention being claimed in the details of the port arrangement and valve construction, apart from the novel combination herein disclosed, there is thought to be no need for tracing the flow of the water during downflow softening from the point where it enters the inlet 40 from the raw water supply pipe 39 as raw water and leaves the outlet 42 as softened water delivered to the service system through pipe 41, nor would it appear to be necessary to follow the upflow backwash flow from the point where the water enters the inlet 40 from the raw water supply pipe 39 and is discharged at 44 to the drain pipe 43 as waste water. Neither would it appear to be necessary to trace the downflow salting flow from where the raw water from pipe 39 enters through inlet 40 to its exit through drain pipe 43, during which flow brine drawn from the brine compartment 55 through pipes 50 and 47 is entrained with the raw water, the downflow salting being followed by downflow rinsing when the plastic ball float 84 (FIG. 4), after a predetermined amount of brine has been withdrawn from the brine compartment, shuts off the brine flow by closing the port 85 in the rubber seat ring 86. It should suffice to state that during the backwash flow the flow rate is fixed by an automatic regulator indicated at 87 in FIGS. 5 and 6, and also that during rinsing the flow rate is regulated by the ejector rinse rate controller 88 shown in FIGS. 5 and 11. The backwash time, as will soon appear, is predetermined by the setting of cam 89 on the front of the timer dial 90 in circumferentially spaced relationship to another cam 91, closer spacing giving a shorter backwash time and wider spacing a longer backwash time, inasmuch as the timer dial 90, as will so appear, is driven in a clockwise direction by the timer motor 92 through suitable reduction gearing to make one turn in one hour. The dial 90 carries another cam 93 on the front thereof, cams 89, 91 and 93 all, in turn, operating a timer switch 94 to start the power motor 95 which drives the crank wheel and lift cam assembly 81 by means of a pinion 96 on the armature shaft of the motor meshing with gear 97 which forms the crank wheel of assembly 81. Another cam 98 on the back of timer dial 90 operates a hold switch 99, and there is still another cam—a stop cam 100—on the gear 97 which operates a stop switch 101 at the end of each complete turn of gear 97 to stop the motor 95.

Figure 10:
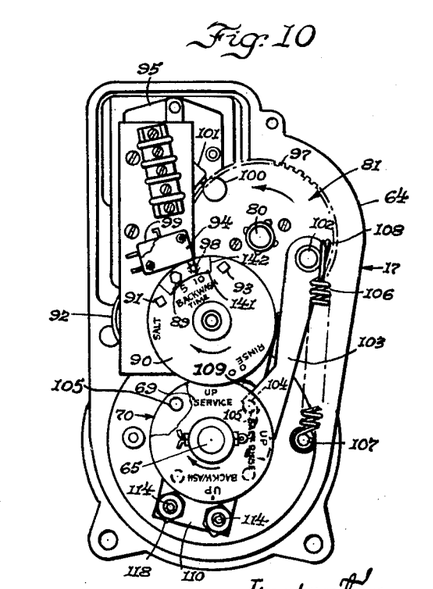
FIG. 10 is a front view of the master valve assembly, showing the automatic valve operating mechanism.
Figure 11:
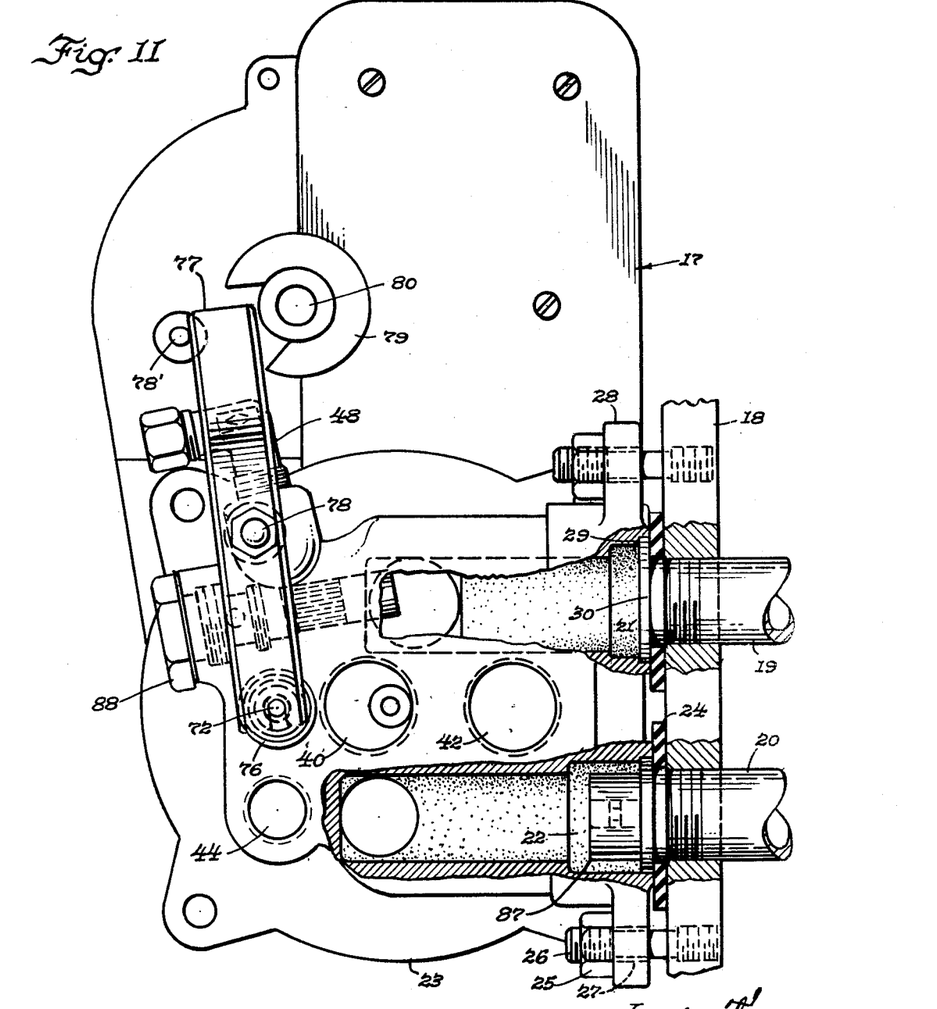
FIG. 11 is a rear view of FIG. 10 on a larger scale, showing portions of the valve base broken away to better illustrate the construction.
Figure 12:
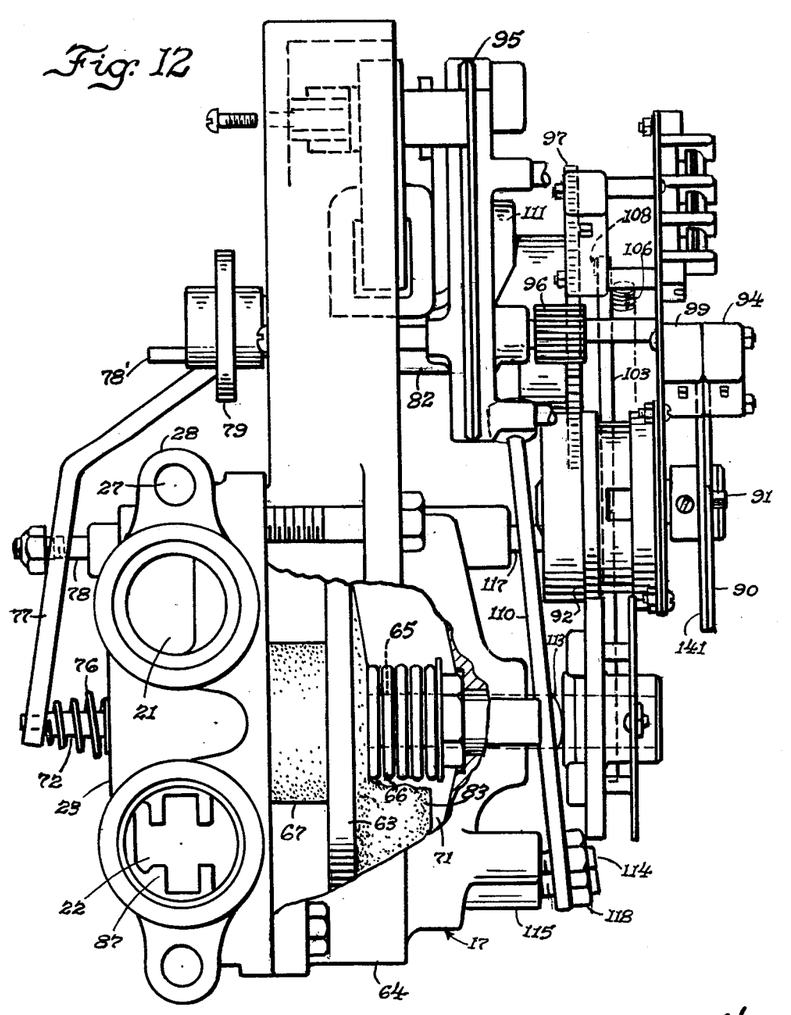
FIGS. 12 and 13 are side views of the master valve assembly from opposite sides, FIG. 13 showing portions of the bonnet and base broken away to better illustrate the construction.

A crank pin 102 on gear 97 has one end of a stem plate drive pawl 103 pivotally connected thereto, the other end having a hook 104 defined thereon for driving engagement with one after another of the four pins 105, spaced 90° apart on the stem plate ratchet 70, fixed to the stem 65 of the stem plate 63. A coiled tension spring 106 anchored at one end, as at 107, to the cover plate 64 is attached at its other end, as at 108, to the pawl 103 to urge it normally in a clockwise direction toward engagement with the pins 105, the cam surface 109 on the free end of the pawl behind the hook 104 serving by engagement with the next to be engaged pin 105 during the idle retracting stroke of pawl 103 to cam the pawl outwardly relative to said pin until the hook 104 engages over said pin preparatory to the next forward stroke of the pawl. In that way the stem plate ratchet 70 is turned through 90° in each turn of the gear 97, so that the stem plate 63 is accordingly indexed a quarter turn for each turn of said gear.

A stem plate lift lever 110 is operable by means of a rotary stem plate lift cam 111 to lift the stem plate 63 in timed relationship to the indexing of the stem plate 63 by means of pawl 103. This lift lever 110 has an opening 112 intermediate its ends through which the stem 65 of the stem plate extends, and on opposite sides of this opening 112 are rounded fulcrum bosses 113 slidably engaging the back of the stem plate ratchet 70, so that the lever 110, which has adjustable set screws 114 in one end bearing in recesses in the bosses 115 on the cover plate 64 and has a cam follower roller 116 mounted on its other end to ride on the lift cam 111, and is also suitably guided by means of a pin 117 to assume the lateral thrust on the lever 110 incident to riding of the roller 116 up on the lift cam 111, will lift the stem plate 63 against the resistance of spring 66, and hold it in raised position clear of the seat rings 67 while the stem plate is being indexed through 90°, after which, when the roller 116 runs off the cam 111, the stem plate 63 is automatically reseated under the pressure of spring 66. There is sufficient frictional resistance to turning of the stem plate 63 afforded by the seat rings 67 so that there is no need for any holding pawl although, of course, it would be a simple matter to provide such a pawl in connection with the pins 105 on the stem plate ratchet 70 if one were needed. The set screws 114 are adjusted so that the lever 110 is loose when the roller 116 is off the cam 111, thereby avoiding any likelihood of interference with the proper seating of the stem plate 63 by means of spring 66. Lock nuts 118 threaded on the set screws 114 and tightened against the lever 110 serve to hold the screws in adjusted position. Obviously, if these screws are threaded inwardly to take up more play, the stem plate 63 is lifted a trifle higher as more of the lift of cam 111 is taken advantage of.

Figures 4, 5, 7:
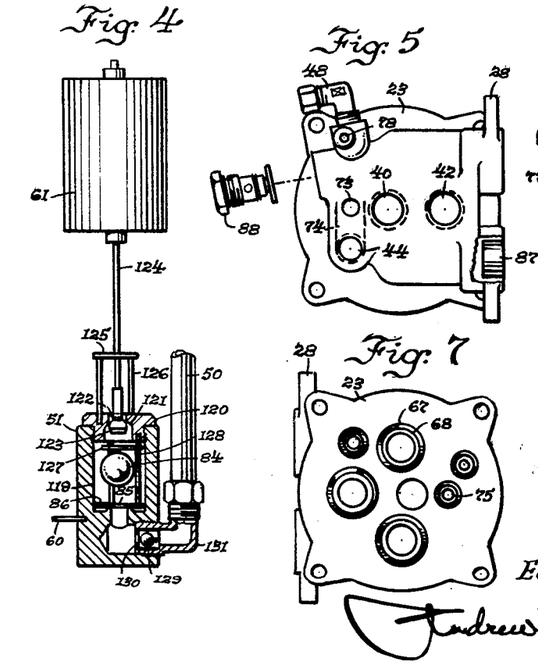
FIG. 4 is an enlarged vertical section through the foot valve for the brine tank.
FIGS. 5, 6 and 7 are a rear view, side view and face view, respectively, or the master valve base, FIG. 5 indicating the ejector rinse rate controller assembly removed from the base, and FIG. 6 indicating the drain shut-off plug assembly, as well as the operating lever therefor and its associated stud and nut removed from the base for purposes of better illustration.
Figure 6:
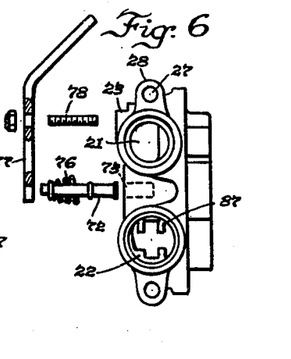

Referring to FIGS. 3 and 4, the foot valve 51 has a chamber 119 therein, the open top of which is closed by a plug 120 in which a tapered annular seat 121 is provided around a refill water discharge port 122 that is arranged to be closed by means of a tapered or poppet valve 123 provided on the lower end of the rod 124 of float 61. A guide ring 125 is mounted on top of the plug 120 by means of legs 126 to engage the rod 124 and support the float against cocking during its limited vertical travel between the seat 121 and the top of a baffle plate 127 mounted in the upper end portion of the chamber 119 on vertical pins 128 that extend downwardly from the plug 120 in the chamber 119 and serve incidentally as a cage for the float ball 84 to guide it toward the port 85 while otherwise keeping it more or less centrally disposed in its vertical travel between the bottom of the baffle 127 and the seat around the port 85. The ball 84, being light, floats in the brine and will not close the port 85 until the brine level drops that far during the salting operation in the regeneration of the softener. The high brine level is fixed by the location of the float 61 slidably adjustable up or down on the float rod 124. The low brine level (fixed by the location of the seat ring 86) is approximately three inches from the bottom of the brine compartment 55. Brine from the brine compartment is conducted through the suction and refill pipe 50 and flows downwardly through the port 122 past the high level shut-off valve 123. When the brine level drops to the shut-off valve 123 and air enters chamber 119 the shut-off valve 123 comes to rest on top of the baffle 127 and the ball float 84 gradually lowers and finally closes port 85, shutting off the brine draw, leaving about a three-inch depth of brine in the bottom of the brine tank. This reserve depth is desirable because it serves as a sludge sump for accumulation of non-solubles and foreign matter in the salt which may get into the brine compartment and which it is desired to avoid conducting into the bed 34 in the softener. After the float ball 84 shuts off the brine flow, the master valve 17 remains in the same position for rinsing approximately another thirty minutes as the raw water delivered rinses the waste brine out of the bed along with released magnesium and other minerals, as well known in this art. The ejector action at 88 furnishes more than adequate suction to draw the shut-off valve 123 off its seat 121 to start the brine draw. After the rinsing time has run out, the stem plate 63 is returned to "Service" position and, due to the porting of the stem plate, the suction and refill line 47–50 is again under pressure from the raw water supply pipe 39 so that the brine compartment is refilled. At this time, a small brass check ball 129 caged behind the annular seat 130 in the elbow fitting 131 serves as a flow rate regulator, slowing up the refill flow so that the water cannot rush in and raise the shut-off valve 123 and seat it at 121 before the proper predetermined amount of refill water has been supplied to the brine tank.

In conclusion, referring to FIG. 1 again, the softener 15 with the valve mechanism 17 and calendar clock 132 mounted thereon is enclosed neatly in a cabinet 133, which consists of a sheet metal base 134, opposed sheet metal side panels 135, lower sheet metal front panel 136, upper sheet metal front panel or access door 137, and sheet metal top panel 138, in addition to the previously mentioned sheet metal brine tank cover 45, which extends the full width and depth of the inside of the cabinet, except for that portion of the top of the brine tank which is covered by a sheet metal salt fill door 139 hinged, as at 140, to the front edge of the cover 45. This door when opened and laid back serves as a baffle to direct the salt down into the brine tank in pouring. The cover 45 has upwardly projecting marginal flanges abutting the side panels 135, as shown. The back of the cabinet is left open for ventilation, which is not objectionable inasmuch as the back is against a wall anyway. The lower front panel 136 and top panel 138 are both removably secured in place but the upper front panel 137 is held in place by a feeler catch for easy removal and replacement. Thus, the calendar clock 132 and all other controls are accessible easily upon removal of the upper front panel 137 for whatever minor adjustments may be necessary from time to time. In the event of a major service operation becoming necessary, the top panel 138 may be removed by loosening a few bolts for better access to the valve mechanism 17.

In operation, the calendar clock 132 closes a pilot circuit for timer motor 92 at a given time each week, if the unit is so set, or at two or even more times each week, up to as many times as twice daily, if such frequency of regeneration is necessary. Timer dial 90 is then in the position shown with holding cam 98 on the back of the dial in the position where it has opened the circuit for the timer motor 92 at the end of the previous regeneration, causing it to stop at that point. The calendar clock (or, for that matter, a manual switch, if one is provided in addition to the calendar clock for starting regeneration that way alternatively) having closed the pilot circuit keeps the timer motor 92 running until the holding cam 98 moves away from the hold switch 99, so that the hold switch is again closed and keeps the timer motor 92 going for one hour, during which the dial 90 makes a complete revolution and programs the complete regeneration cycle. Cam 89 is the first to operate timer switch 94, thereby starting power motor 95 to rotate the crank wheel and lift cam assembly 81 (FIG. 10) as the gear 97 of this assembly turns in a counterclockwise direction. The stem plate pawl 103 engaging one of the four pins 105 of the stem plate ratchet 70 turns the stem plate 63 through a quarter turn, lever 110 operated by cam 111 having lifted the stem plate 63 immediately after lever 77 operated by cam 79 has depressed plug 72 to close the drain port 75 to equalize pressure on opposite sides of the stem plate. Stop cam 100 at the end of a complete turn of gear 97 operates stop switch 101 to stop the motor 95 after the stem plate 63 has been given a quarter turn and is reseated. However, cam 89 has a wider face than either cam 91 or cam 93 and serves to hold the timer switch 94 closed until gear 97 has completed two turns, thereby giving the stem plate 63 a half turn from the "Service" position to the "Backwash" position. Timer dial 90 continues turning in a clockwise direction after cam 89 has passed the timer switch 94 and, depending upon the adjustment of cam 89 circumferentially of dial 90 relative to cam 91, the backwash time will be shorter for closer spacing and longer for wider spacing of these cams, as indicated by the numerals 5 and 10 on dial 90 in FIG. 10 which, of course, refer to five minutes and ten minutes, respectively. A separate disk 141 is provided mounting the cam 89 for adjustment along the circumferentially elongated notch 142 in dial 90, the disk 141 and dial 90 being suitably secured together in adjusted relationship. When cam 91 operates timer switch 94 it holds the switch closed only long enough for gear 97 to make one revolution, so that pawl 103 can turn the stem plate 63 only one quarter turn from the "Backwash" position to the "Salt-Rinse" position. The stem plate 63 stays in this position during the drawing of the brine and the subsequent rinsing of the bed 34. The method of stopping brine draw by seating of the ball float 84 in port 85 after a predetermined amount of brine has been drawn from brine compartment 55 should be clear from the above description, and it should likewise be clear that the ejector jet stream used in the brine draw and regulated at 88 becomes the rinse flow when the brine draw is shut off, so for approximately thirty minutes following the salt draw the jet stream serves to rinse the bed until cam 93 reaches the timer switch 94 and starts the motor 95 to return the stem plate 63 to the "Service" position. The timer dial 90 thereafter continues to turn in a clockwise direction until the holding cam 98 on the back of the timer dial actuates the hold switch 99, stopping the timer motor 92 in the position shown, where it remains until the calendar clock 132 (or manual switch, not shown) closes the circuit to start another regenerating cycle.

It is believed the foregoing description conveys a good understanding of the objects and advantages of my invention. The appended claims have been drawn to cover all legitimate modifications and adaptations.

I claim:

1. In combination with a lift-turn valve comprising a ported body member, a ported stem plate member adapted to effect different communication between the ports in the body member in different positions of rotation of the stem plate member, a cover on the body member enclosing said stem plate member, spring means cooperating with said stem plate member to press the same resiliently into sealed operative relationship to the body member, a lever fulcrumed relative to the cover and operatively connected with the stem of said stem plate member to lift said stem plate member when said lever is oscillated, means for oscillating said lever, means for turning said stem plate member from one position to another while the same is lifted, the body member including a drain port communicating with the inside of said cover, a valve plug reciprocable relative to the body member to and from a closed position in the drain port, spring means normally urging said valve plug to a retracted open position, and means for operating said valve plug in timed relation to the oscillation of the aforesaid lever for lifting and reseating the stem plate member, said means comprising a second lever fulcrumed with respect to the body member and having one portion thereof arranged to depress the valve plug upon oscillation of said second lever, and means for oscillating said second lever.

2. In combination with a lift-turn valve comprising a ported body member, a ported stem plate member adapted to effect different communication between the ports in the body member in different positions of rotation of the stem plate member, a cover on the body member enclosing said stem plate member, and spring means cooperating with said stem plate member to press the same resiliently into sealed operative relationship to the body member, a lever fulcrumed relative to the cover and operatively connected with the stem of said stem plate member to lift said stem plate member when said lever is oscillated, means for oscillating said lever, and means for turning said stem plate member from one position to another while the same is lifted, said means comprising a ratchet fixed to the stem of said stem plate member, a pawl engaging said ratchet, a crank wheel arranged to be turned in timed relationship to the oscillation of said lever whereby through said pawl to transmit rotary movement to the stem plate member while the same is lifted, and means for turning said crank wheel.

3. The combination set forth in claim 2, wherein the body member includes a drain port communicating with the inside of said cover, and valve means for closing said port in timed relation to the lifting and turning and reseating of the stem plate.

4. The combination set forth in claim 2 wherein the body member includes a drain port communicating with the inside of said cover, a valve plug reciprocable relative to the body member to and from a closed position in the drain port, spring means normally urging said valve plug to a retracted open position, and means for operating said valve plug in timed relation to the oscillation of the aforesaid lever for lifting and reseating the stem plate member.

5. The combination set forth in claim 2 wherein the body member includes a drain port communicating with the inside of said cover, a valve plug reciprocable relative to the body member to and from a closed position in the drain port, spring means normally urging said valve plug to a retracted open position, and means for operating said valve plug in timed relation to the oscillation of the aforesaid lever for lifting and reseating the stem plate member, said means comprising a second lever fulcrumed with respect to the body member and having one portion thereof arranged to depress the valve plug upon oscillation of said second lever, and means for oscillating said second lever.

6. In combination with a lift-turn valve comprising a ported body member, a ported stem plate member adapted to effect different communication between the ports in the body member in different positions of rotation of the stem plate member, a cover on the body member enclosing said stem plate member, and spring means cooperating with said stem plate member to press the same resiliently into sealed operative relationship to the body member, the stem of said stem plate member extending from said cover, a ratchet fixed on the outer end thereof in spaced relationship to said cover, a lever extending between the cover and having pivotal bearing engagement intermediate its ends with the back of said ratchet, a rotary crank wheel and cam rotatable on an axis in a fixed parallel relationship to said stem, the cam being disposed for operative engagement with the free end of said lever to oscillate the same to lift and reseat said stem plate, a pawl pivotally connected with said crank wheel at one end and operatively engaging the ratchet at its other end to transmit rotary movement to the stem plate in timed relationship to the oscillation of said lever, and means for turning the crank wheel and cam.

7. The structure set forth in claim 6 including means for adjusting the fulcrumed end of said lever with respect to said cover to vary the lift of the stem plate.

8. The combination as set forth in claim 6 wherein the body member includes a drain port communicating with the inside of said cover, a valve for closing said port, and means for operating said valve in timed relationship to the operation of said lever and pawl to close said port before said stem plate is lifted and open said port after said stem plate is reseated.

9. The combination set forth in claim 6 wherein the body member includes a drain port communicating with the inside of said cover, a valve plug reciprocable with respect to said body member toward and away from said port, spring means normally urging said valve plug to retracted position, a second lever fulcrumed intermediate its ends with respect to the body member having one end arranged to operate said valve plug, and a rotary cam turning with the aforesaid crank wheel and cam arranged to engage the free end of said second lever to oscillate the same in timed relationship to the operation of said first mentioned lever and pawl.

10. The combination set forth in claim 6 wherein the body member includes a drain port communicating with the inside of said cover, a valve plug reciprocable with respect to said body member toward and away from said port, spring means normally urging said valve plug to retracted position, a second lever fulcrumed intermediate its ends with respect to the body member having one end arranged to operate said valve plug, and a rotary cam turning with the aforesaid crank wheel and cam arranged to engage the free end of said second lever to oscillate the same in timed relationship to the operation of said first mentioned lever and pawl, there being means for adjusting the fulcrum for said second lever relative to the body member to alter the stroke of said valve plug.

11. The combination as set forth in claim 6, wherein the means for turning the rotary crank wheel and cam through a complete revolution comprises a power motor having an armature shaft, a pinion on the armature shaft driving a gear turning the crank wheel, a stop switch controlling the opening of the motor circuit, a cam for operating said stop switch carried on the crank wheel and arranged to open said stop switch at the end of each complete revolution of the crank wheel, and other switch means for starting the power motor.

12. The combination as set forth in claim 6, wherein the means for turning the rotary crank wheel and cam through a complete revolution comprises a power motor having an armature shaft, a pinion on the armature shaft driving a gear turning the crank wheel, a stop switch controlling the opening of the motor circuit, a cam for operating said stop switch carried on the crank wheel and arranged to open said stop switch at the end of each complete revolution of the crank wheel, and other switch means for starting the power motor, comprising a timer switch operable at predetermined intervals by cams on a timer dial arranged to make a complete turn in a predetermined length of time, a timer motor transmitting drive to said timer dial, a hold switch for opening the circuit of said timer motor operable by a cam on the timer dial, and independent switch means for closing the circuit for the timer motor at preselected intervals.

13. In combination with a lift-turn valve comprising a ported body member, a ported stem plate member adapted to effect different communication between the ports in the body member in different positions of rotation of the stem plate member, and a cover on the body member enclosing said stem plate member, whereby said stem plate member is held seated on said ported body member under fluid pressure in said cover, spring means normally urging said stem plate member to seated position on the body member, said body member including a drain port communicating with the inside of said cover, a lever fulcrumed relative to the cover and operatively connected with the stem of said stem plate member to lift said stem plate member when said lever is oscillated, valve means controlling said drain port operable from the opposite side of said body member from said cover, and means operable independently of said lever for turning said stem plate member from one position to another while the same is lifted and for operating said last mentioned valve means in timed relation to the lifting and turning and reseating of said stem plate member.

14. The combination set forth in claim 13 wherein the valve means comprises a plug reciprocable relative to the body member to and from a closed position in the drain port, and spring means normally urging said plug to a retracted position.

15. In combination with a lift-turn valve comprising a ported body member, a ported stem plate member adapted to effect different communication between the ports in the body member in different positions of rotation of the stem plate member, and a cover on the body member enclosing said stem plate member, whereby said stem plate member is held seated on said ported body member under fluid pressure in said cover, said body member including a drain port communicating with the inside of said cover, a lever fulcrumed relative to the cover and operatively connected with the stem of said stem plate member to lift said stem plate member when said lever is oscillated, means for oscillating said lever, means for turning said stem plate member from one position to another while the same is lifted, and valve means for closing said port mechanically connected with the last mentioned means for operation in timed relation to the lifting and turning and reseating of the stem plate, the valve means comprising a plug reciprocable relative to the body member to and from a closed position in the drain port, spring means normally urging said plug to a retracted position, the aforesaid connection including a second lever fulcrumed with respect to the body member having one portion thereof arranged to depress the valve plug upon oscillation of said second lever, said second lever being oscillated in timed relationship to the first mentioned lever.

16. In a plate-type valve, the combination of a ported body member, a ported stem plate member adapted to effect different communication between the ports in the body member in different positions of rotation of the stem plate member, a cover on the body member enclosing said stem plate member, spring means urging said stem plate member normally into sealed operative relationship to the body member, a lever fulcrumed relative to the cover and operatively connected with and freely rotatable relative to the stem of said stem plate member to lift the same when the lever is oscillated, means for oscillating said lever so as to lift said stem plate member and reseat it, and means independent of said lever for turning said stem plate member from one position to another while the same is lifted.

17. In a plate-type valve, the combination of a ported body member, a ported stem plate member adapted to effect different communication between the ports in the body member in different positions of rotation of the stem plate member, a cover on the body member enclosing said stem plate member, spring means urging said stem plate member normally into sealed operative relationship to the body member, a lever fulcrumed relative to the cover and operably connected with and freely rotatable relative to the stem of said stem plate member to lift the same when the lever is oscillated, means for oscillating said lever so as to lift said stem plate member and reseat it, means independent of said lever for turning said stem plate member from one position to another while the same is lifted, the body member including a drain port communicating with the inside of said cover to relieve fluid pressure therein active on the stem plate member helping to hold the same seated on the body member, a valve for closing said drain port, and means for operating said valve in timed relationship to the operation of said lever and stem plate turning means.

18. In combination with a lift-turn valve comprising a ported body member, a ported stem plate member adapted to effect different communication between the ports in the body member in different positions of rotation of the stem plate member, a cover on the body member enclosing said stem plate member, spring means cooperating with said stem plate member to press the same resiliently into sealed operative relationship to the body member, a lever fulcrumed relative to the cover and operatively connected with and rotatable relative to the stem of said stem plate member to lift said stem plate member when said lever is oscillated, means for oscillating said lever so as to lift said stem plate member and reseat it, and pawl and ratchet means operable independently of said lever while the stem plate member is lifted to turn said stem plate member from one position to another.

19. The combination set forth in claim 18, wherein the body member includes a drain port communicating with the inside of said cover, and valve for closing said port in timed relation to the lifting and turning and reseating of the stem plate.

20. The combination set forth in claim 18 wherein the body member includes a drain port communicating with the inside of said cover, a valve plug reciprocal relative to the body member to and from a position in the drain port, spring means normally urging said valve plug to a retracted position, and means for operating said valve plug in timed relation to the oscillation of the aforesaid lever for lifting and reseating the stem plate member.

21. In combination with a lift-turn valve comprising a ported body member, a ported stem plate member adapted to effect different communication between the ports in the body member in different positions of rotation of the stem plate member, and a cover on the body member enclosing said stem plate member, whereby said stem plate member is held seated on said ported body member under fluid pressure in said cover, spring means normally urging said stem plate member to seated position on the body member, a lever fulcrumed relative to the cover and operatively connected with and freely rotatable relative to the stem of said stem plate member to lift said stem plate member when said lever is oscillated, a drain port on said body member communicating with the inside of said cover, valve means controlling said drain port, and means operable independently of said lever for turning said stem plate member from one position to another while the same is lifted and for operating said last-mentioned valve means in timed relation to the lifting and turning and reseating of said stem plate member.

References Cited in the file of this patent
UNITED STATES PATENTS

| | | |
|---|---|---|
| 2,710,018 | Wolfe | June 7, 1955 |
| 2,743,739 | Mansen | May 1, 1956 |
| 2,767,139 | Hagman | Oct. 16, 1956 |
| 2,777,515 | Stirling | Jan. 15, 1957 |
| 2,825,363 | Bird | Mar. 4, 1958 |
| 2,857,964 | Vore | Oct. 28, 1958 |
| 2,863,559 | Schulze | Dec. 9, 1958 |
| 2,909,189 | Gugeler | Oct. 20, 1959 |